(12) United States Patent
Martel

(10) Patent No.: US 10,949,175 B2
(45) Date of Patent: Mar. 16, 2021

(54) METHOD OF CARRYING OUT MODIFICATIONS TO A SOFTWARE APPLICATION

(71) Applicant: SICK AG, Waldkirch/Breisgau (DE)

(72) Inventor: Christopher Martel, Rust (DE)

(73) Assignee: SICK AG, Waldkirch/Breisgau (DE)

( * ) Notice: Subject to any disclaimer, the term of this patent is extended or adjusted under 35 U.S.C. 154(b) by 0 days.

(21) Appl. No.: 16/359,199

(22) Filed: Mar. 20, 2019

(65) Prior Publication Data

US 2019/0294422 A1 Sep. 26, 2019

(30) Foreign Application Priority Data

Mar. 22, 2018 (EP) ..................................... 18163323

(51) Int. Cl.
*G06F 9/44* (2018.01)
*G06F 9/445* (2018.01)
(Continued)

(52) U.S. Cl.
CPC ............ *G06F 8/38* (2013.01); *G06F 3/04842* (2013.01); *G06F 9/44521* (2013.01); *G06F 9/451* (2018.02); *G06F 9/454* (2018.02); *G06F 8/34* (2013.01); *G06F 8/36* (2013.01); *G06F 8/51* (2013.01); *G06F 8/53* (2013.01);
(Continued)

(58) Field of Classification Search
CPC .......... G06F 9/465; G06F 9/454; G06F 17/24; G06F 17/28; G06F 17/289; G06F 17/2836; G06F 9/451; G06F 9/44521; G06F 9/45516; G06F 8/38; G06F 8/34; G06F 8/36; G06F 8/70; G06F 8/51; G06F 8/53; G06F 8/52; G06F 8/60; G06F 8/10; G06F 8/61; G06F 3/04842; G06F 40/47; G06F 40/166; G06F 40/58; G06F 40/106
See application file for complete search history.

(56) References Cited

U.S. PATENT DOCUMENTS 5,583,761 A * 12/1996 Chou ...................... G06F 9/454
715/201
5,678,039 A * 10/1997 Hinks ..................... G06F 9/454
(Continued)

FOREIGN PATENT DOCUMENTS

WO 0108006 A1 2/2001

OTHER PUBLICATIONS

Clemens Hammacher, Design and Implementation of an Efficient Dynamic Slicer for Java, Nov. 11, 2008, [Retrieved on Dec. 14, 2020]. Retrieved from the internet: <URL: https://www.st.cs.uni-saarland.de/publications/files/hammacher-bachthesis-2008.pdf> 40 Pages (1-38) (Year: 2008).*

(Continued)

*Primary Examiner* — Anibal Rivera
(74) *Attorney, Agent, or Firm* — Nath, Goldberg & Meyer; Jerald L. Meyer

(57) ABSTRACT

A method of carrying out modifications to a software application having an application code that has a graphical user interface (GUI) is provided. The method includes the steps of: injecting a dynamic library into the software application to allow control of the software application; reading at least one portion of the application code, with the portion relating to the GUI; modifying a section of the GUI; and saving the amended section of the GUI.

16 Claims, 4 Drawing Sheets

Figure 1:
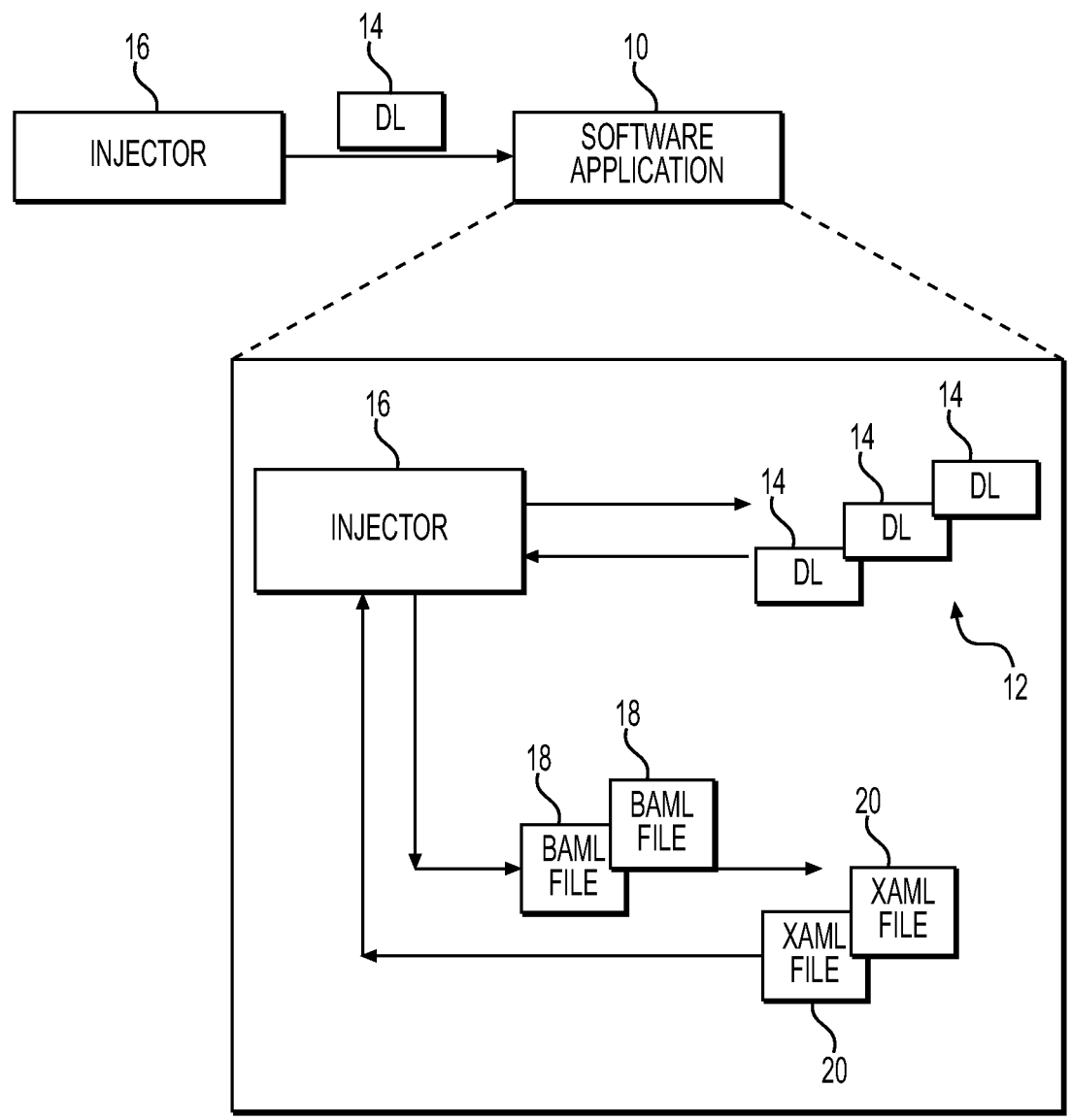

(51) Int. Cl.
*G06F 8/38* (2018.01)
*G06F 9/451* (2018.01)
*G06F 3/0484* (2013.01)
*G06F 8/34* (2018.01)
*G06F 8/70* (2018.01)
*G06F 9/455* (2018.01)
*G06F 8/36* (2018.01)
*G06F 40/47* (2020.01)
*G06F 40/58* (2020.01)
*G06F 40/166* (2020.01)
*G06F 8/53* (2018.01)
*G06F 8/61* (2018.01)
*G06F 8/51* (2018.01)

(52) U.S. Cl.
CPC ............ *G06F 8/61* (2013.01); *G06F 8/70* (2013.01); *G06F 9/45516* (2013.01); *G06F 40/166* (2020.01); *G06F 40/47* (2020.01); *G06F 40/58* (2020.01)

(56) References Cited

U.S. PATENT DOCUMENTS

| | | | | |
|---|---|---|---|---|
| 6,035,121 A * | 3/2000 | Chiu | ............... | G06F 9/454 717/141 |
| 6,275,790 B1 * | 8/2001 | Yamamoto | ............... | G06F 8/38 704/8 |
| 6,904,563 B2 * | 6/2005 | Kumhyr | ............... | G06F 40/166 715/256 |
| 7,318,020 B1 * | 1/2008 | Kim | ............... | G06F 40/58 704/2 |
| 8,307,349 B2 * | 11/2012 | Ishimoto | ............... | G06F 9/454 717/136 |
| 8,407,675 B1 * | 3/2013 | Clark | ............... | G06F 8/53 717/131 |
| 2003/0001854 A1 * | 1/2003 | Jade | ............... | G06F 9/454 345/581 |
| 2003/0004703 A1 * | 1/2003 | Prabhakar | ............... | G06F 40/55 704/8 |
| 2003/0046059 A1 * | 3/2003 | Litster | ............... | G06F 9/454 704/8 |
| 2003/0084401 A1 * | 5/2003 | Abel | ............... | G06F 16/9535 715/205 |
| 2003/0154183 A1 * | 8/2003 | Warren | ............... | G06F 16/904 |
| 2003/0229554 A1 * | 12/2003 | Veres | ............... | G06Q 40/00 705/35 |
| 2004/0036718 A1 * | 2/2004 | Warren | ............... | G06F 16/904 715/744 |
| 2004/0036722 A1 * | 2/2004 | Warren | ............... | G06F 40/106 715/866 |
| 2004/0039989 A1 * | 2/2004 | Warren | ............... | G06F 9/451 715/262 |
| 2004/0056894 A1 * | 3/2004 | Zaika | ............... | G06F 9/454 715/762 |
| 2006/0294463 A1 * | 12/2006 | Chu | ............... | G06F 9/454 715/703 |
| 2008/0022267 A1 * | 1/2008 | Johnson, Jr. | ............... | G06F 8/51 717/143 |
| 2008/0060085 A1 * | 3/2008 | Samzelius | ............... | G06F 21/6218 726/30 |
| 2008/0077384 A1 * | 3/2008 | Agapi | ............... | G06F 9/454 704/2 |
| 2009/0199165 A1 * | 8/2009 | Ishimoto | ............... | G06F 9/454 717/136 |
| 2013/0111460 A1 * | 5/2013 | Mohamed | ............... | G06F 8/61 717/172 |
| 2013/0138421 A1 * | 5/2013 | Moulder | ............... | G06F 40/242 704/3 |
| 2014/0181792 A1 * | 6/2014 | Fanning | ............... | G06F 8/60 717/124 |
| 2016/0253746 A1 * | 9/2016 | Morrison | ............... | G06Q 30/0625 705/26.62 |
| 2017/0132841 A1 * | 5/2017 | Morrison | ............... | G06K 9/00671 |
| 2017/0132842 A1 * | 5/2017 | Morrison | ............... | G06T 19/006 |

OTHER PUBLICATIONS

Official Letter dated Feb. 28, 2019 corresponding to European application No. 18163323.1-1224.
European Search Report dated Jun. 26, 2018 corresponding to European application No. 18163323.1-1224.

* cited by examiner

METHOD OF CARRYING OUT MODIFICATIONS TO A SOFTWARE APPLICATION

CROSS-REFERENCE TO RELATED APPLICATION

This application claims the benefit of European Patent Office (EPO) Patent Application No. 18163323.1, filed on Mar. 22, 2018.

The present invention relates to a method of carrying out modifications to a software application. The software application comprises an application code that in particular determines the behavior of the software applications.

Software applications are typically prepared for a global market so that the software application has to be offered in different languages (multilingual). It is necessary for this purpose to translate existing text of the software application from the original language into the corresponding further languages.

It is known to use an editing system, for example a content management system (CMS), for this purpose into which the translated texts are entered and which stores the original text.

The original text in such CMS systems can disadvantageously not be recognized in the context of the application and also not in the context of other text modules. Problems can hereby occur in the translation so that incorrect translations are generated that, for example, do not match the context. A plurality of time and cost intensive iterations thereby have to be run through until a suitable translation is present.

It is therefore the underlying object of the invention to provide a method of modifying or adapting a software application that makes it possible to prepare translations with a reduced time effort and that in particular avoids said iterations for the correction of translation errors.

This object is satisfied in accordance with the invention by a method in accordance with claim 1.

In accordance with the method in accordance with the invention, modifications to a software application are carried out, wherein the software application comprises an application code. In addition, the software application has a graphical user interface (GUI). The method in accordance with the invention comprises the steps injecting a dynamic library into the software application to allow a control of the software application;

reading at least one portion of the application code, with the portion relating to the GUI; and modifying a region of the GUI and saving the modified region of the GUI.

The method steps can preferably be carried out in the aforesaid order.

The invention is based on the recognition that due to the injection of the dynamic library, the software application can be controlled by means of the injected dynamic library. It is then again possible by the control to read a part or a portion of the application code of the software application, to then present it, for example, and to modify the GUI of the software application directly and/or indirectly. The advantage thus in particular results in the preparation of translations that the text to be translated can be detected in its context in the GUI of the software application. Incorrect translations due to an incorrect interpretation due to a lack of context can be avoided in this manner. The process of the translation of software applications can thus be considerably accelerated and can be made more efficient.

It is additionally of advantage that in particular also only a part (i.e. said portion) of the application code can be read or extracted. The whole software application therefore does not have to be read, whereby a saving in computing power and memory on the computer system that carries out the method is achieved.

After the reading of the portion, an instance and/or a copy of the portion can be generated that is then used for the modification of the section of the GUI. The modification of the section of the GUI can in particular take place in a separate application and/or in a separate user interface (of the editor software named further below), as will be discussed in more detail later.

In brief, the invention therefore makes it possible to mark a specific window or a specific text box in a software application, for example by selection by a mouse, and then to modify the text box during the runtime (i.e. live). It can immediately be recognized in this manner whether the translation is correct and, for example, also fits in the text box provided. The modified section of the GUI can subsequently be saved to store e.g. the translated text (i.e. the modified section of the GUI) in this manner in a database, in the later-mentioned resource file and/or in the previously mentioned content management system.

It has been found in accordance with the invention in this respect that the injection of the dynamic library advantageously makes it possible to allow the control of different software applications without any direct access to the source code of the software application having to be present. It is in particular hereby made possible that, for example, translation offices can translate already completed software applications in a simple manner.

The injected dynamic library can also be called an injector. The term dynamic library in particular respectively means a dynamically linked/integrated library. The injection of the dynamic library can in particular also be a "DLL injection", wherein the code of the injector is executed in the address space of the software application. The injector is preferably a component of the editor software explained below in the form of a dynamic library that serves as an interface to the software application. The injector preferably comprises an application logic for the parsing and evaluating (i.e. for the reading and extraction of code) of the software application.

It is only mentioned for clarification that the use of the term "different languages" herein relates to different human languages (e.g. English, Spanish, or German) and not to different programming languages.

Advantageous further developments of the invention can be seen from the description, from the dependent claims, and from the Figures.

In accordance with a first advantageous embodiment, the reading of the portion of the application code takes place by means of "reflection". Reflection is to be understood as the reading of information, and in particular meta information, from an application code. Reflection makes it possible with object-oriented programming, for example, to query information on classes or on their instances during the runtime. Reflection is in particular also known under the name of introspection. The visibility, the data type of a return value, or the type of handover parameters of a method can, for example, be queried by reflection. Reflection is e.g. possible when the application code was generated by means of a framework that is executed in a virtual environment (e.g. Java, .NET, or Smalltalk).

Reflection in particular provides the advantage that procedures and methods present as standard can be used to read the portion of the application code. It is in turn hereby achieved that processing steps can be saved, whereby the method can in turn be carried out efficiently.

In accordance with a further advantageous embodiment, the application code is executable code in which the injection takes place during its runtime. The injection of the dynamic library into the executable code therefore takes place while the software application is being executed. The advantage in particular hereby results that—as indicated above—in particular the context of the text modules to be translated is visible to the translator since the software application can, for example, carry out its "normal" operation. An increased understanding of the context of the text modules is created for the translator in this manner so that translation errors can be reduced, whereby a time saving and a gain in efficiency result.

In accordance with a further advantageous embodiment, the dynamic library comprises executable code that is executed after the injection. The dynamic library can, for example, be a dynamic link library (DLL) that comprises the executable code. After the injection, the code of the injected dynamic library can be executed together with the software application. The dynamic library here makes use of the software application and can, for example, invoke or extract the further dynamic libraries (e.g. DLLs) linked to the software application. Such an extracted dynamic library that is an original element of the software application can thus form the read portion of the application code. The read portion is in particular read in binary form, i.e. as a binary code. The application code is in particular also a binary code, i.e. executable code.

A binary code is in particular to be understood as executable code and/or as bytecode. For the .NET framework, the binary code of the GUI can, for example, be present in the form of a BAML file (binary application markup language). In contrast, a source code is to be understood as a code not executable by a machine, with the source code typically being designed such that it is understandable for a human programmer. A XAML source code file (extensible application markup language) can e.g. be compiled in a BAML file for the .NET framework.

In accordance with a further advantageous embodiment, after the reading of the portion of the application code, the portion is decompiled. In the decompilation, the executable code or the application code can be reconverted into a source code. A BAML file can, for example, be converted into a XAML file.

The decompilation has the advantage that the modification of the GUI can then e.g. be carried out in the XAML format that is easier to process. The translation of a text module can thus be carried out in a simple manner, whereby in turn a saving of the required memory capacity, of the required processing power, and of time can be achieved. The corresponding text modules can in particular be determined from the XAML file and/or from the decompiled portion and can optionally be used as instances in the reproduction named below.

In accordance with a further advantageous embodiment, a graphical reproduction of at least some of the GUI of the software application is generated from the portion of the application code, with the graphical reproduction preferably being shown in a further graphical user interface. The reproduction can therefore be shown, for example, in a second window and/or in a further application window, in particular on the same screen or on a second monitor.

The appearance and also the "look and feel" of the GUI of the software application can therefore be at least substantially understood in the reproduction so that the translation also becomes aware of connections within the software application and thus of the context.

The reproduction can preferably be shown and/or generated within editor software that is software separate from the software application. The editor software can comprise an editor user interface (editor GUI) within which the reproduction is shown. The editor GUI can also be configured to select the software application to be translated and/or to present the modifications at the GUI of the software application. The (original) GUI of the software application and the reproduction can also be shown simultaneously in time and/or next to one another in the editor software to provide an overview of the "before and after".

The editor software can also carry out further ones of the said method steps, for example the injection, the reading and/or the decompiling.

The editor software can be carried out in a so-called "sandbox", i.e. separated from other programs and/or with restricted access rights. An intervention of a virus scanner or of other security software during the carrying out of the injection can be prevented by the sandbox.

In accordance with a further advantageous embodiment, a modification of the graphical reproduction is carried out, with the modification of the reproduction, for example, effecting a corresponding modification of the portion of the application code. This means that the modification of the GUI is in particular carried out in the reproduction. The expression "modification of a section of the GUI" is accordingly to be understood such that how the modification of the GUI acts is visible to the user in some form. The modification can, for example, include the replacement of an original text module with a text module in a different language (translation). The modified text element is then preferably observed directly during the runtime (i.e. live) in the context of the software application through the modification of the graphical reproduction. The portion of the application code can also be modified in parallel due to the modification of the reproduction. It is likewise possible to modify a copy and/or an instance of the application code or to store only the modified (e.g. translated) text (e.g. in the resource file explained below).

In addition to a mere modification of text modules, graphical elements of the GUI of the software application can also be modified. For example, a modification of the text can make a modification of the size of a "button" necessary if the translated text is longer than the original text. The size of borders or text boxes can also be modified, for example. Modifications of the portion of the application code and/or of its instance and/or copy are likewise hereby effected. The method can for this purpose preferably be configured to modify the attributes of Windows Forms elements.

The method is in particular used for software modifications that use the Windows Presentation Formation (WPF). A further reduction of the required processing power results for such software modifications since here in turn standard routines can be used to e.g. carry out the decompilation.

The modification of the graphical reproduction is preferably presented by means of a display device to present the effect of the modification. The display device can in particular be a screen so that a comparison (before and after) is immediately visible.

In accordance with a further advantageous embodiment, a section or a position is selected in the GUI by means of an input device, with the read portion of the application code relating to the selected section and/or to the selected position. Consequently, only that respective portion of the application code can be read that relates to the section and/or position selected by the user by means of the input device. For this purpose, which position in the GUI belongs to which portion of the application code can be recognized by IDs (identification marks), for example. If, for example, a text module is selected by means of the input device, that portion of the application code can then, in particular exclusively, be read that is responsible for the function and/or for the presentation of the text module. A data saving can be effected by such a selective reading of only small portions of the application code. The portion thus read is then in particular decompiled and presented as a reproduction. After the presentation of the reproduction, a modification of the GUI is finally possible (e.g. within the reproduction).

The input device can, for example, be a mouse and/or a touchscreen. The mouse position or a finger position on the touchscreen is in particular determined for determining the portion of the application code to be read.

In accordance with a further advantageous embodiment, a graphical element is modified on the changing of the GUI, with the graphical element preferably being a text module, with the modification of the GUI further preferably effecting a modification of the portion of the application code and/or an instance of the portion of the application code. As already indicated further above, a modification, i.e. the preparation of a translation, for example, can immediately have an effect on the portion and/or the instance of the portion in application codes. A font size, a color, a size of text boxes, a size of buttons, and/or a font direction (e.g. for Arabian or Japanese) can, for example, be modified.

Alternatively or additionally, it is also possible to store the modifications in a resource file. The resource file can, for example, be an Excel file, a CSV file, or a text file. After the translation process, all the translated text modules can then be stored in the resource file, for example. In addition, the original text modules can also be associated with the translated text modules in the resource file in addition to the translated text modules.

In accordance with a further advantageous embodiment, the resource file is read into the editor software, in particular before the presentation of the reproduction. After the modification of the GUI of the software application, the modifications carried out, in particular by the editor software, can be stored in the resource file.

In accordance with a further advantageous embodiment, a data link to an editorial system (CMS) is established, with at least some text modules contained in the software application preferably being stored in the CMS, with changes to the GUI and/or to the portion of the application code being transferred to the CMS. Which translation was prepared for which original text module can thus respectively be transmitted to the CMS. The data transfer to the CMS can take place by means of a data link, for example. It is alternatively also possible to store the modifications to the GUI in the resource file and subsequently to transfer the resource file to the CMS. Based on the translation then stored in the CMS, new application software can then be generated with the translation from the CMS. The data link to the CMS can be established by an Ethernet connection, for example.

In accordance with a further advantageous embodiment, the modification to the GUI is first stored in a volatile memory, with the modification of the GUI subsequently being stored in a non-volatile memory, with the storage preferably taking place separately from the application code. A temporary saving of the modification to the GUI can first consequently in particular take place in the main memory (RAM) of the computer system carrying out the method. The saving in the main memory of the computer system has the advantage that a much slower storing, e.g. on a hard disk of the computer system, can be dispensed with. Modifications possibly carried out multiple times in the translation can thus be carried out in a fast manner and can also be presented with a fast response time in the reproduction, for example.

Subsequently, for example after a user release, the modification can be stored in the non-volatile memory. The non-volatile memory can in particular be the CMS system and/or said resource file.

It is generally also possible to save the modifications directly back into the application code of the software application, in particular with a preceding compiling of the modifications to directly obtain a software application in a further language in this manner.

A further subject matter of the invention is an apparatus for carrying out the method of the above-explained kind. The apparatus can in particular be a computer system having an input device and a display device, i.e., for example, a personal computer (PC), a tablet computer, or a smartphone. Both the software application itself and its reproduction can be displayed on the display device. Said CMS in contrast can be present on a separate computer system, with a data link, e.g. by means of the internet, being able to exist between the apparatus for carrying out the method in accordance with the invention and the CMS.

A further subject matter of the invention is a data carrier having program code on it that, when executed, carries out, i.e. implements, a method of the above-explained kind.

The statements made on the method in accordance with the invention apply accordingly, in particular with respect to advantages and preferred embodiments, to the apparatus in accordance with the invention and to the data carrier in accordance with the invention.

Figure 2:
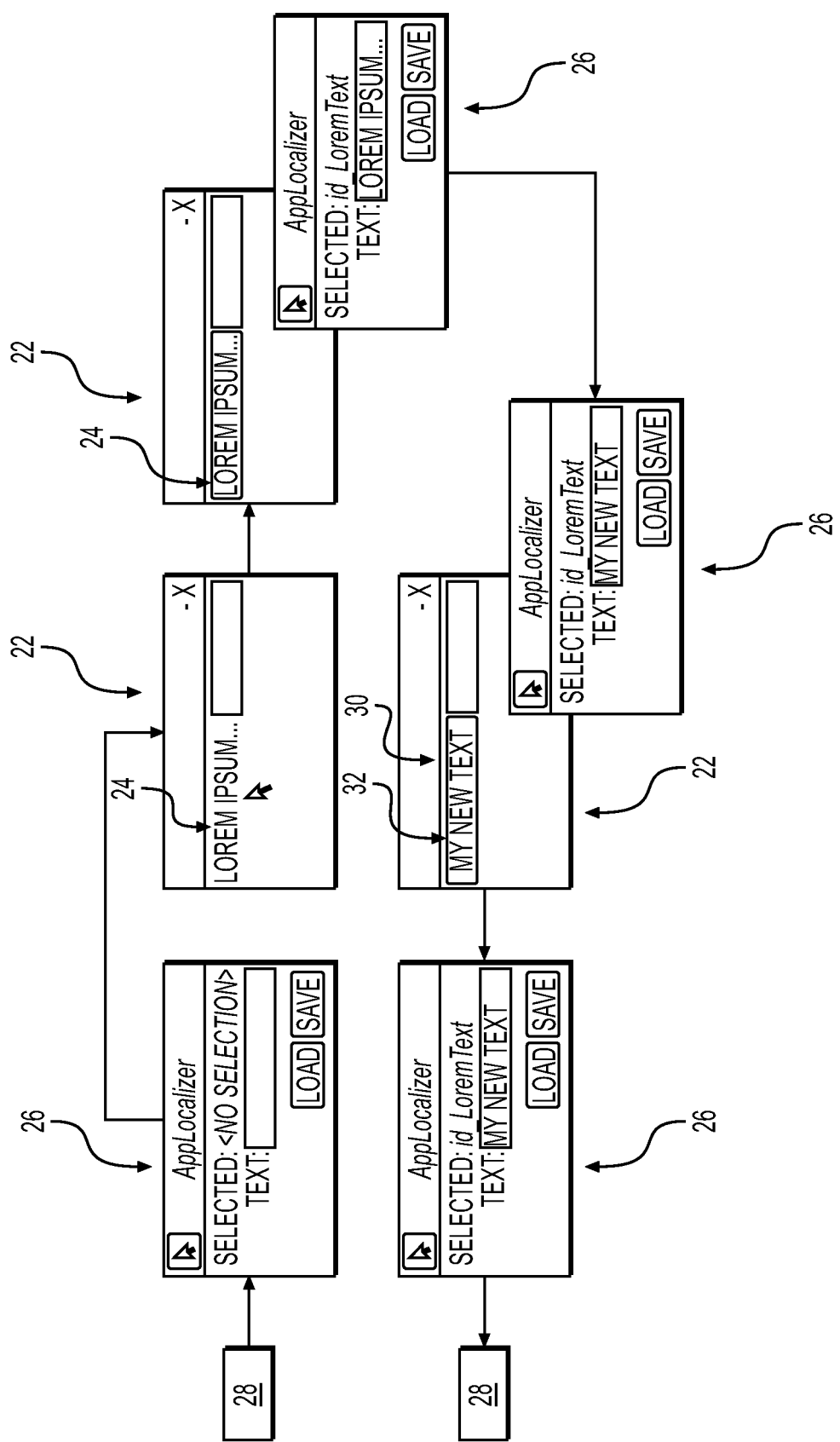
Figure 3:
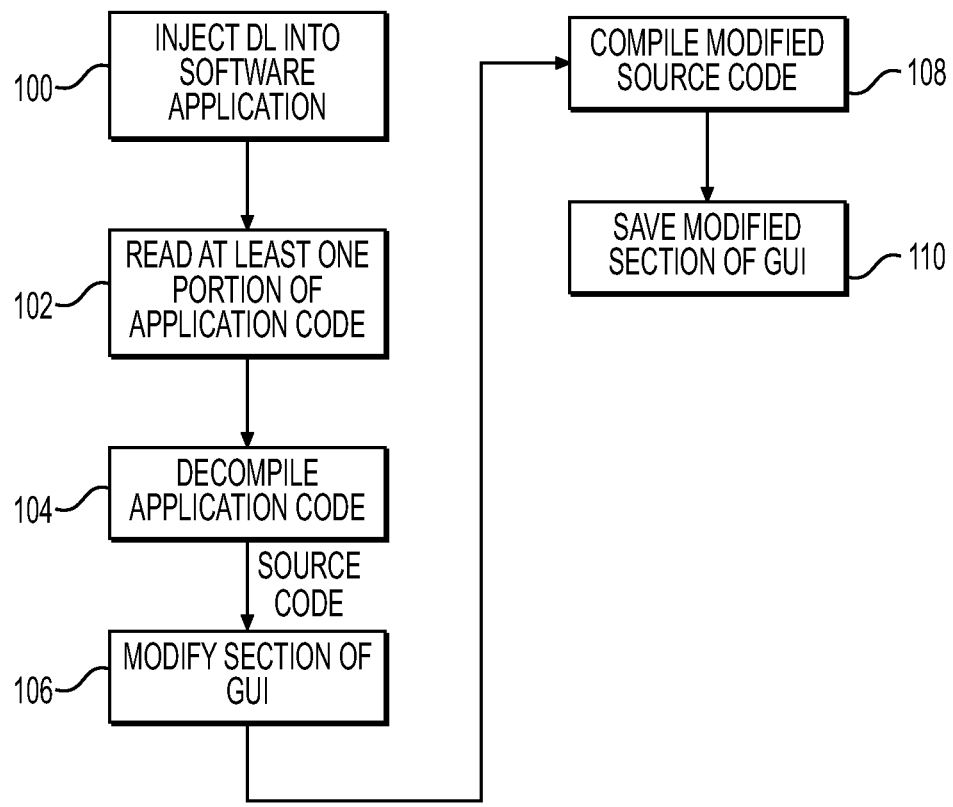
Figure 4:
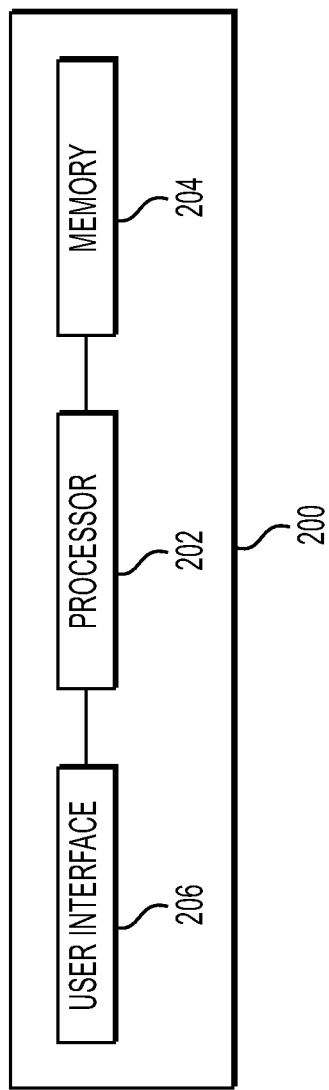

The invention will be described in the following purely by way of example with reference to the drawings. There are shown:

FIG. 1 schematically shows the procedure for reading a portion of the application code of a software application;

FIG. 2 schematically shows the procedure for modifying a text module of a GUI of the software application;

FIG. 3 is a flowchart showing the method of carrying out modifications to a software application; and FIG. 4 is a block diagram showing system components of an apparatus for carrying out modifications to a software application.

FIG. 1 schematically shows a software application 10 that is based on an application code 12. The application code 12 is an executable code that comprises or integrates a plurality of dynamic libraries (DLs) 14. The dynamic libraries 14 are DLL files in the present example.

An injector 16 in the form of a further dynamic library (DL) 14 is injected into the software application 10 (step 100 in FIG. 3). The injector 16 has the effect that the software application 10 can be controlled by means of the injector 16. The injector 16 also uses methods of reflection for this purpose.

After the injection of the injector 16, the dynamic libraries 14 present in the application code 12 and/or the integrated dynamic libraries 14 are determined. The information from the dynamic libraries 14 is then read as binary code (step 102 in FIG. 3), as BAML files 18 in the present example, and is then decompiled by means of the injector 16 (step 104 in FIG. 3). After the decompilation, source code files are then present that are XAML files 20 in the present example.

On the presence of the XAML files 20, it is then possible to carry out a modification to the software application 10 (step 106 in FIG. 3), as will be described in the following with reference to FIG. 2. Following modification, the modified source code is then compiled (step 108 in FIG. 3).

FIG. 2 shows a first graphical user interface (first GUI) 22 that is generated by the software application 10. The first GUI 22 comprises a plurality of graphical elements, also including a text box 24 in the original language.

If a translation of the original text 24 should now be made (i.e. if a modification of the first GUI 22 should take place), an injection such as described with respect to FIG. 1 can be carried out. The injection can, for example, be controlled by means of a second user interface (second GUI) of editor software 26. The editor software 26 can invoke the respective original texts 24 of the software application 10 from a resource file 28 (for example, an Excel file).

The original text 24 can then be clicked in the editor software 26 by a user to indicate that this text should be replaced or translated. The text to be translated can then be identified in the editor software 26 and can be invoked from the resource file 28 or from the XAML files 20. The translation 32 of the text can then be input, with a reproduction 30 of the first GUI 22 being able to be displayed, with the reproduction 30 including the translated text 32 and presenting the translated text 32. If the translated text 32 is considered correct, the modification of the first GUI 22 thus made can be stored (step 110 in FIG. 3), with the translated text 32 being stored in the resource file 28. The storing takes place such that the translated text 32 is associated with the original text 24 in the resource file 28.

It is thus possible that the translator prepares a translation of the complete software application 10 gradually in a simple and comfortable manner, with the respective context of the respective original text 24 being known and thus translation errors being able to be minimized.

It should be understood that the above described operations may be performed on any suitable type of computer or the like, such as apparatus 200 of FIG. 4, including a suitable processor 202 or the like, which is in communication with computer readable memory 204 and user interface 206, each of which is well known in the art.

REFERENCE NUMERAL LIST 10 software application
12 application code
14 dynamic library
16 injector
18 BAML file
20 XAML file
22 first GUI
24 original text
26 editor software
28 resource file
30 reproduction
32 translated text

The invention claimed is:

1. A method of carrying out modifications to a software application having an application code that has a graphical user interface (GUI), said method comprising:
   injecting a dynamic library into the software application to allow a control of the software application, wherein the application code is executable code in which the injection takes place during the runtime of the application code;
   reading at least one portion of the application code, with the at least one portion relating to the GUI;
   decompiling the at least one portion of the application code to produce a source code associated with the at least one portion of the application code;
   modifying a section of the GUI, wherein the modifying of the section of the GUI includes modifying a graphical element, and the modifying of the section of the GUI effecting a modification of the source code corresponding to modification of the at least one portion of the application code and/or of an instance of the at least one portion of the application code;
   compiling the modified source code, the modified source code representing the modified section of the GUI; and
   saving the modified section of the GUI in a location selected from the group consisting of a volatile memory location, a non-volatile memory location, a combination thereof, and a memory location separate from a memory location associated with the application code.

2. The method in accordance with claim 1, wherein
the reading of the portion of the application code takes place by means of reflection.

3. The method in accordance with claim 1, wherein
the dynamic library comprises executable code that is executed after the injection.

4. The method in accordance with claim 1, wherein
a graphical reproduction of at least some of the GUI of the software application is generated from the portion of the application code.

5. The method in accordance with claim 4, wherein
the graphical reproduction is presented in a further graphical user interface.

6. The method in accordance with claim 4, wherein
a modification of the graphical reproduction is carried out.

7. The method in accordance with claim 6, wherein
the modification of the reproduction effects a corresponding modification of the portion of the application code.

8. The method in accordance with claim 6, wherein
the modification of the graphical reproduction is presented by means of a display device to present the effect of the modification.

9. The method in accordance with claim 1, wherein
a section or a position in the GUI is selected by means of an input device, with the read portion of the application code relating to the selected portion and/or to the selected position.

10. The method in accordance with claim 1, wherein
the graphical element is a text module.

11. The method in accordance with claim 1, wherein
a data link to an editorial system (CMS) is established, with at least some text modules contained in the software application, with modifications to the GUI and/or to the portion of the application code being transferred to the CMS.

12. The method in accordance with claim 11, wherein text modules contained in the software application are stored in the CMS.

13. The method in accordance with claim 1, wherein the modification of the GUI is first stored in the volatile memory, with the modification to the GUI subsequently being stored in the non-volatile memory.

14. The method in accordance with claim 1, wherein the step of saving the modified section of the GUI comprises storing in the memory location separate from the memory location associated with the application code.

15. An apparatus having a processor for carrying out modifications to a software application having an application code that has a graphical user interface (GUI), the apparatus being adapted to:

inject a dynamic library into the software application to allow a control of the software application, wherein the application code is executable code in which the injection takes place during the runtime of the application code;

read at least one portion of the application code, with the at least one portion relating to the GUI;

decompile the at least one portion of the application code to produce a source code associated with the at least one portion of the application code;

modify a section of the GUI, wherein the modifying of the section of the GUI includes modifying a graphical element, and the modifying of the section of the GUI effecting a modification of the source code corresponding to modification of the at least one portion of the application code and/or of an instance of the at least one portion of the application code;

compile the modified source code, the modified source code representing the modified section of the GUI; and save the modified section of the GUI in a location selected from the group consisting of a volatile memory location, a non-volatile memory location, a combination thereof, and a memory location separate from a memory location associated with the application code.

16. A non-transitory computer-readable storage medium having program code on it that, when executed implements a method of carrying out modifications to a software application having an application code that has a graphical user interface (GUI), said method comprising:

injecting a dynamic library into the software application to allow a control of the software application, wherein the application code is executable code in which the injection takes place during the runtime of the application code;

reading at least one portion of the application code, with the at least one portion relating to the GUI;

decompiling the at least one portion of the application code to produce a source code associated with the at least one portion of the application code;

modifying a section of the GUI, wherein the modifying of the section of the GUI includes modifying a graphical element, and the modifying of the section of the GUI effecting a modification of the source code corresponding to modification of the at least one portion of the application code and/or of an instance of the at least one portion of the application code;

compiling the modified source code, the modified source code representing the modified section of the GUI; and saving the modified section of the GUI in a location selected from the group consisting of a volatile memory location, a non-volatile memory location, a combination thereof, and a memory location separate from a memory location associated with the application code.

\* \* \* \* \*